(12) United States Patent
Spisak et al.

(10) Patent No.: US 10,771,493 B2
(45) Date of Patent: Sep. 8, 2020

(54) COGNITIVE SECURITY EXPOSURE ANALYSIS AND RESOLUTION BASED ON SECURITY TRENDS

(71) Applicant: International Business Machines Corporation, Armonk, NY (US)

(72) Inventors: Michael Spisak, East Northport, NY (US); Steven D. McKay, Kechi, KS (US); Mariya Ali, Herndon, VA (US); Rhonda L. Childress, Austin, TX (US); Michelle Rivers, Marietta, GA (US); Carlos E. Aguilera, Powder Springs, GA (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 16/133,877

(22) Filed: Sep. 18, 2018

(65) Prior Publication Data
US 2020/0092319 A1    Mar. 19, 2020

(51) Int. Cl.
*H04L 29/06* (2006.01)
*G06F 16/2457* (2019.01)
(Continued)

(52) U.S. Cl.
CPC .... *H04L 63/1433* (2013.01); *G06F 16/24578* (2019.01); *G06F 40/20* (2020.01);
(Continued)

(58) Field of Classification Search
CPC .......................... H04L 63/0263; H04L 63/1433
See application file for complete search history.

(56) References Cited

U.S. PATENT DOCUMENTS

| 8,272,061 B1 * | 9/2012 | Lotem | G06F 21/577 |
| | | | 709/223 |
| 8,918,883 B1 * | 12/2014 | Boyle | G06F 21/577 |
| | | | 726/25 |

(Continued)

OTHER PUBLICATIONS

High, Rob, "The Era of Cognitive Systems: An Inside Look at IBM Watson and How it Works", IBM Corporation, Redbooks, Dec. 12, 2012, 16 pages.

*Primary Examiner* — Ali Shayanfar
(74) *Attorney, Agent, or Firm* — Stephen J. Walder, Jr.; Jeffrey S. LaBaw

(57) ABSTRACT

A security vulnerability analysis mechanism is provided that ingests content from a plurality of content source computing devices to identify instances of security vulnerability content in the ingested content. The mechanism performs a security trend analysis on the instances of security vulnerability content to identify a relative ranking of security vulnerabilities. The mechanism identifies computing resources of a specified computing infrastructure and a criticality of the computing resources to an operation of the computing infrastructure. The mechanism generates a prioritized listing of security vulnerabilities associated with the computing infrastructure based on the relative ranking of security vulnerabilities and the criticality of the computing resources in the computing infrastructure. The mechanism outputs a notification to a user via a user computing device, indicating the prioritized listing of security vulnerabilities.

16 Claims, 5 Drawing Sheets

(51) Int. Cl.
  *G06N 7/00* (2006.01)
  *G06F 40/20* (2020.01)
(52) U.S. Cl.
  CPC ........... *G06N 7/00* (2013.01); *H04L 63/1441* (2013.01); *H04L 63/0263* (2013.01)

(56) References Cited

U.S. PATENT DOCUMENTS

| | | | |
|---|---|---|---|
| 10,257,217 B2* | 4/2019 | Hamdi | G06F 7/24 |
| 10,454,969 B2* | 10/2019 | Haerterich | H04L 63/1491 |
| 2006/0195588 A1* | 8/2006 | Pennington | G06F 21/53 709/227 |
| 2009/0049553 A1* | 2/2009 | Vasudeva | H04L 63/1433 726/25 |
| 2009/0077666 A1* | 3/2009 | Chen | G06Q 10/0631 726/25 |
| 2011/0125734 A1 | 5/2011 | Duboue et al. | |
| 2012/0011493 A1 | 1/2012 | Singh et al. | |
| 2012/0036220 A1* | 2/2012 | Dare | H04L 67/04 709/217 |
| 2012/0036552 A1* | 2/2012 | Dare | H04L 41/0803 726/1 |
| 2015/0033305 A1* | 1/2015 | Shear | G06F 21/53 726/6 |
| 2016/0259638 A1 | 9/2016 | El Maghraoui et al. | |
| 2017/0220964 A1* | 8/2017 | Datta Ray | H04L 63/20 |
| 2018/0032736 A1 | 2/2018 | Inagaki et al. | |
| 2018/0124094 A1 | 5/2018 | Hamdi | |
| 2018/0165457 A1* | 6/2018 | Holz | H04L 63/1433 |
| 2018/0205755 A1* | 7/2018 | Kavi | G06F 16/951 |
| 2018/0268309 A1* | 9/2018 | Childress | G06N 5/022 |
| 2018/0309632 A1* | 10/2018 | Kompella | H04L 41/50 |
| 2018/0351987 A1* | 12/2018 | Patel | G06F 16/951 |
| 2019/0020674 A1* | 1/2019 | Vervier | H04L 63/1433 |
| 2019/0052665 A1* | 2/2019 | Mahieu | G06N 3/04 |
| 2020/0082095 A1* | 3/2020 | Mcallister | G06F 11/3624 |

* cited by examiner

| ASSET | TYPE | MISSION AND CUSTOM. IMPACT | SAFETY AND ENVIRON. IMPACT | SINGLE-POINT FAILURE | PREVENT. MAINT. HISTORY | CORRECT. MAINT. HISTORY | MTBF OR RELIABILITY | PROB. OF FAIL. | SPARES LEAD TIME | REPLACE VALUE | PLANNED UTILIZ. RATE |
|---|---|---|---|---|---|---|---|---|---|---|---|
| 310 | 320 | 330 | 332 | 334 | 336 | 338 | 340 | 342 | 344 | 346 | 348 |
| XYZ123 | E-COMM. INTERNET FACING WEB SERVER | 8 | 2 | 9 | 9 | 10 | 7 | 7 | 5 | 10 | 10 |
| ... | ... | ... | ... | ... | ... | ... | ... | ... | ... | ... | ... |

*FIG. 3*

COGNITIVE SECURITY EXPOSURE ANALYSIS AND RESOLUTION BASED ON SECURITY TRENDS

BACKGROUND

The present application relates generally to an improved data processing apparatus and method and more specifically to mechanisms for performing cognitive security exposure analysis and resolution based on security trends.

Computer security is a critically important area for most modern enterprises as they must secure the computing resources of their enterprises from attacks which may occur from both external and internal sources. In security their computing resources, it is important to be able to determine what vulnerabilities the computing resources have to such attacks. A vulnerability is a weakness which can be exploited by a threat actor, such as an attacker, to perform unauthorized actions within a computer system. To exploit a vulnerability, an attacker must have at least one applicable tool or technique that can connect to a system weakness. Such vulnerabilities may also be referred to as an "attack surface."

A security risk is often incorrectly classified as a vulnerability. The security "risk" is the potential of a significant impact resulting from the exploit of a security "vulnerability." There are vulnerabilities without risk: for example, when the affected asset has no value. A vulnerability with one or more known instances of working and fully implemented attacks is classified as an exploitable vulnerability, i.e. a vulnerability for which an exploit exists. The window of vulnerability is the time from when the security hole was introduced or manifested in the computing resource, e.g., software, to when access was removed, a security fix was available/deployed, or the attacker was disabled. This window can be large in some instances, allowing attackers to gain access to computing resources for an unacceptable amount of time before discovery and before the exploit can be remedied by a security fix.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system comprising a processor and a memory is provided where the memory comprises instructions that are executed by the processor to specifically configure the processor to implement a security vulnerability analysis engine that performs the method. The method comprises ingesting, by the security vulnerability analysis engine executing in the data processing system, content from a plurality of content source computing devices to identify instances of security vulnerability content in the ingested content. The method further comprises performing, by the security vulnerability analysis engine, a security trend analysis on the instances of security vulnerability content to identify a relative ranking of security vulnerabilities. The method further comprises identifying, by the security vulnerability analysis engine, computing resources of a specified computing infrastructure and a criticality of the computing resources to an operation of the computing infrastructure. Moreover, the method comprises generating, by the security vulnerability analysis engine, a prioritized listing of security vulnerabilities associated with the computing infrastructure based on the relative ranking of security vulnerabilities and the criticality of the computing resources in the computing infrastructure. In addition, the method comprises outputting, by the security vulnerability analysis engine, a notification to a user via a user computing device, indicating the prioritized listing of security vulnerabilities.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an example diagram of a data structure for a particular instance of a computing resource present in the enterprise infrastructure environment;

DETAILED DESCRIPTION

Figure 1:
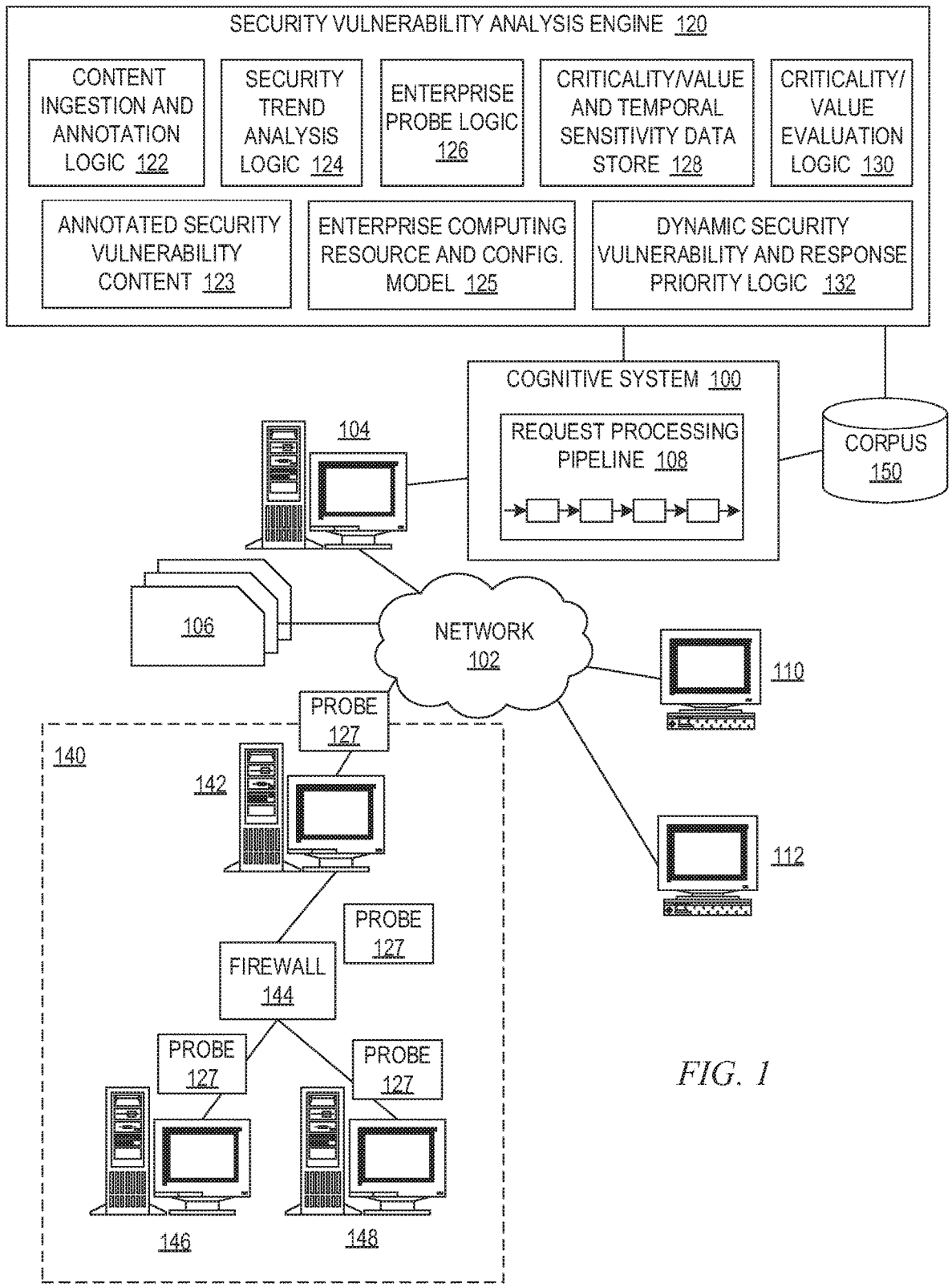
FIG. 1 depicts a schematic diagram of one illustrative embodiment of a cognitive system in a computer network.

The illustrative embodiments provide mechanisms for performing cognitive security exposure analysis and resolution based on security trends. Security exposure or vulnerabilities of enterprise computing systems are a significant concern in our modern information technology society. Data breaches are common place as hackers attempt to penetrate enterprise computing systems to access private or sensitive data for various purposes, e.g., identity theft, corporate espionage, terrorism, or the like, and/or perform attacks on such computing systems to corrupt data and/or cause the computing systems to perform operations contrary to the desires of the enterprise, e.g., placing viruses in the computing systems.

Keeping informed of the most recent attempts by hackers to break into and access protected computing resources, e.g., data, applications, hardware, etc., is a time consuming and daunting task. Often times, information about attacks may appear in news articles, blogs, social media, and the like, before formal security information from security entities about such attacks is disseminated to those responsible for security of particular enterprise systems, despite efforts by these individuals to stay informed. As a result, such security professionals often have to play "catch-up" and harden their computing devices well after the potential for exposure has occurred. Moreover, such security professionals may not be aware of security vulnerabilities that may exist when new types of attacks occur elsewhere due to the inherent delays in dissemination of information. Furthermore, with limited resources, human resources and computing resources, it is often beneficial to take into consideration the criticality or value of particular computing system resources to the enterprise when prioritizing the focus of these limited resources on various security vulnerabilities. Thus, it would be beneficial to have a mechanism that leverages the large amount of external knowledge available from a variety of different information sources to determine the security vulnerabilities of a computing system and address those security vulnerabilities based on a security risk assessment and enterprise value assessment of the potentially vulnerable computing system resources.

The illustrative embodiments provide mechanisms that determine security risk and security response priority based on security trend analysis performed on a variety of external and internal information sources. The security trend analysis leverages industry specific threats focused on the sector of the associated enterprise. The mechanisms of the illustrative embodiments evaluate indicators of compromise from various security vulnerabilities identified via the security trend analysis performed on collections of external source information, e.g., x-force exchange or other external sources of structured/unstructured data, and internal source information, e.g., private corpus of structured/unstructured data.

The illustrative embodiments may utilize natural language processing mechanisms, cognitive system mechanisms, and the like, to evaluate structured/unstructured data to identify trends in security vulnerabilities and exploits, as well as the attacks that take advantage of these vulnerabilities and exploits. Such information that may be extracted from the natural language content includes, but is not limited to, attack identifiers, computing resources targeted by the attacks, effects of the attacks, indications of patches or fixes for thwarting such attacks, and the like. This information may be periodically or continuously collected and evaluated to identify the current trends in security vulnerabilities and attacks on computing system resources so as to be as pro-active as possible to address such threats.

For example, with the mechanisms of the illustrative embodiments, the cognitive system may implement a predictive model to determine the likeliness that particular types of computing resources may be at risk of an attack or may otherwise represent a security vulnerability to the enterprise. The predictive model may be generated based on data breaches and attack statistics of success/failures (systems of record) from the enterprise itself and other mined data sources, as well as hacking trends and attack vectors identified (system of operations) from analysis of electronic content from various sources, e.g., open Internet sources, the dark web, and other unstructured data sources. These sources of information and corresponding analysis results may be combined into training models, tests sets, and blind sets. The predictive model may be trained using the cognitive system services, e.g., IBM Watson available from International Business Machines Corporation of Armonk, N.Y., with proposed system configurations and changes based on indicators of compromise of predicted threats within an enterprise environment.

The mechanisms of the illustrative embodiments further classify computing system resources as to their overall enterprise value or criticality to the enterprise computing system by scoring computing resources based on a number of enterprise characteristics that determine the value of the computing resource to the functioning or business of the enterprise. The particular enterprise characteristics considered may take many different forms depending on the desired implementation. For example, in one illustrative embodiment, the enterprise characteristics may include such characteristics as mission and customer impact, safety and environmental impact, ability to isolate single-point-failures, preventative maintenance history, corrective maintenance history, mean time between failures (MTBF) or "reliability," probability of failure, spares lead time, asset replacement value, planned utilization rate, and the like.

The illustrative embodiments utilize a machine learning mechanism to learn the relative importance of the various characteristics based on a baseline of initial values that may be obtained, for example, from manufacturers or real-world experience of users. As time passes, and more data is gathered about the relative importance of the enterprise characteristics, the machine learning mechanisms continue to update the data points to more appropriate values. The process of gathering of the actual data values may be performed using automated methods. Table 1 provides an example description of each of the enterprise characteristics according to one illustrative embodiment.

TABLE 1

Enterprise Characteristics Description

| Data | Definition | Source | Quantification method |
| --- | --- | --- | --- |
| Mission Impact | Overall importance of the system to a specific mission | Asset Management Application Database | Number of critical mission applications running on the system |
| Safety and Environmental Impact | The impact of processes and/or operations on the health and safety of their staff and that of the community. | Asset Management Database | Is it an operational technology (OT - i.e. SCADA). A system will get points per classification. |

TABLE 1-continued

Enterprise Characteristics Description

| Data | Definition | Source | Quantification method |
|---|---|---|---|
| Single point of failure | A point within the system (e.g. router, server), that if it fails will cease ability to execute the mission | IT Architecture (human input) | architectural review (T/F) |
| Preventive Maintenance History | The history of care and/or servicing of systems for the purpose of successful operations | System of Record (ticketing system) | Comparison to other systems and/or recommended best practices over time |
| Corrective Maintenance History | History of maintenance performed to restore a system to its operational state | System of Record (ticketing system) | Comparison to other systems and/or recommended best practices over time |
| Reliability | A measure of trust on the correct functioning of the system | System of Record (ticketing system) | MTBF—mean time between failures |
| Spare lead time | The time allowed to replace a failed system or system component with an available replacement | Support Contract (human or automated input) | Comparison to other systems |
| Asset replacement value | The cost of replacing an operations capability | Asset Management Database | Physical and intellectual property (IP) evaluation |
| Utilization Rate | The usage of a system or component of a system compared to its available maximum usage over time | IT log management and monitoring system | Statistical Analysis |

In one illustrative embodiment, each enterprise characteristic may be scored on a scoring range of 1-10 and the sum of all the enterprise characteristics may be evaluated based on a scoring range from 1-100. A weighted evaluation of these enterprise characteristics may further be performed as well, where certain characteristics are more heavily weighted than others depending on the desired implementation, e.g., depending on the computing resource, safety and environmental impact may be more highly weighted than, for example, corrective maintenance history. This is just one example, and any scoring methodology with different ranges and/or different weightings may also be used without departing from the spirit and scope of the illustrative embodiments.

In some illustrative embodiments, an enterprise computing resource model is generated that defines various types of computing resources and the particular enterprise characteristic values associated with the computing resource types. For example, a computing resource type of "e-commerce internet facing server" may be defined with a plurality of enterprise characteristics having associated characteristic values. The enterprise characteristic values may be determined based on a default value set associated with general computing resource types. The default values may then be modified for the particular enterprise for which the security exposure evaluation is being performed. That is, a user interface may be provided through which an system administrator of the enterprise may adjust the enterprise characteristic values associated with these various computing resource types to make them specific to a particular enterprise.

Furthermore, automated mechanisms may be provided for evaluating the enterprise characteristic values associated with enterprise characteristics for specific instances of computing resources in a particular enterprise. For example, with these automated mechanisms, a user may identify a given industry classification of the enterprise which may then be used to retrieve the default pre-defined set of enterprise computing resources, and enterprise characteristic values for enterprise characteristics for the various enterprise computing resources, for the particular industry classification, e.g., for an e-commerce web service, customer facing computing resources are more important than perhaps backend computing resources, such as switches, routers, etc. The mechanisms of the illustrative embodiments may then scan the network environment of the enterprise, or otherwise received network environment information for the enterprise, and identify computing system resources that are linked to or associated with the defined industry type of the enterprise specified by the user. The mechanisms of the illustrative embodiments may further take into consideration the relative value placed on the various computing resource types and/or individual specific computing resource instances by the system administrator and/or other individuals associated with the enterprise. Moreover, the mechanisms may further take into consideration whether particular computing resources are protecting other computing resources that are considered high value, e.g., a firewall protecting a high value computing resource. Furthermore, the mechanisms of the illustrative embodiments may evaluate the incident tickets from service management systems, asset monitoring, etc., to determine and pre-populate scores for such characteristics as MTBF, failure probability, and maintenance history, for example. The result of this evaluation is a set of enterprise characteristic values for each of the identified computing system resources found in an enterprise environment.

The combination of the enterprise characteristic values together represent an overall enterprise value or criticality of the computing resource to the enterprise environment. This overall enterprise value or criticality may change with time and thus, a particular computing resource may be more or less valuable to the enterprise environment at certain time periods, e.g., certain times of the day, week, month, year, etc. For example, payroll computing resources may be considered more valuable or critical to the functionality of the enterprise environment at the middle and end of each calendar month, employee networking resources may be more valuable or critical during the middle of the day on weekdays and less value or critical on weekends or in the evenings. Thus, with the mechanisms of the illustrative embodiments, temporal characteristics may be included in the evaluation of the current enterprise value or criticality of a computing resource.

Moreover, computing resource change histories and schedules may be evaluated to determine levels of security risk associated with the computing resources. For example, for computing resources that have recently undergone a change for security vulnerability purposes, their risk assessment may be lowered as they are less vulnerable to attack, with the opposite also being true for computing resources that have not been changed or updated recently. For computing resources that have a scheduled change, update, or patch in the near future, the same is also true. This evaluation may be included with an evaluation of the security risk of particular types of computing resources as determined from the natural language processing and cognitive system analysis of external and internal information as touched upon above to identify a security risk assessment for various types of computing resources associated with the given enterprise environment.

Thus, both a security risk assessment is generated from a variety of sources based on a cognitive analysis of natural language information sources, and an enterprise value or criticality of the various computing resources is generated taking into account various enterprise characteristics, baseline or default characteristic values, specific user defined modifications to the default characteristic values, relative priority or value of instances of the computing resources in the enterprise environment and the computing resources they are protecting (if applicable), as well as temporal characteristics and maintenance history information. The combination of the security risk assessment and the enterprise value or criticality is used to generate an indicator of compromise which indicates a potential seriousness of a security vulnerability to the enterprise according to currently information and the enterprise environment, taking into account temporal factors as well. This indicator of compromise may be updated dynamically by dynamically performing the evaluations previously outlined above.

The indicators of compromise for each of the computing resources may be used to relatively rank these computing resources relative to one another and present a representation of the relative severity of the potential security vulnerabilities to a system administrator or other authorized individual. Moreover, in some illustrative embodiments, the indicators of compromise may be used to perform a lookup operation for patches, updates, or other fixes that are associated with the computing system resource. These patches, updates, or other fixes, if possible, may then be automatically applied to the computing resource so as to harden them against the potential attacks. For those patches, updates, configuration changes, firewall rules changes, or other fixes that are not able to be automatically applied, a corresponding notification may be generated and sent to the system administrator or other authorized individual so that they may take steps to implement the patches, updates, configuration changes, firewall rules changes, or other fixes.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides a specifically computer tool that provides mechanisms for discovering types of security vulnerabilities of computing resources, e.g., software and/or hardware computing resources, as identified via a trend analysis on structured and/or unstructured, e.g., natural language, content available from a variety of different sources of information, e.g., the dark web (i.e. the portion of the Internet that is only accessible by means of special software, thereby allowing users and websites to remain anonymous or untraceable), open Internet, internal documentation and data structures, etc. Moreover, the mechanisms of the illustrative embodiments determine the relative criticality or value of computing resources to the operation of the enterprise and prioritizes security responses to the discovered security vulnerabilities that are applicable to computing resources in the enterprise environment based on the relative criticality or value of the computing resources. In addition, in some illustrative embodiments, temporal factors affecting criticality and value of computing resources may be considered to determine dynamic modifications to this modeling of the enterprise environment, or infrastructure. The resulting model may be used to drive notifications to system administrators, automatic application of security responses, and the like.

Figure 2:
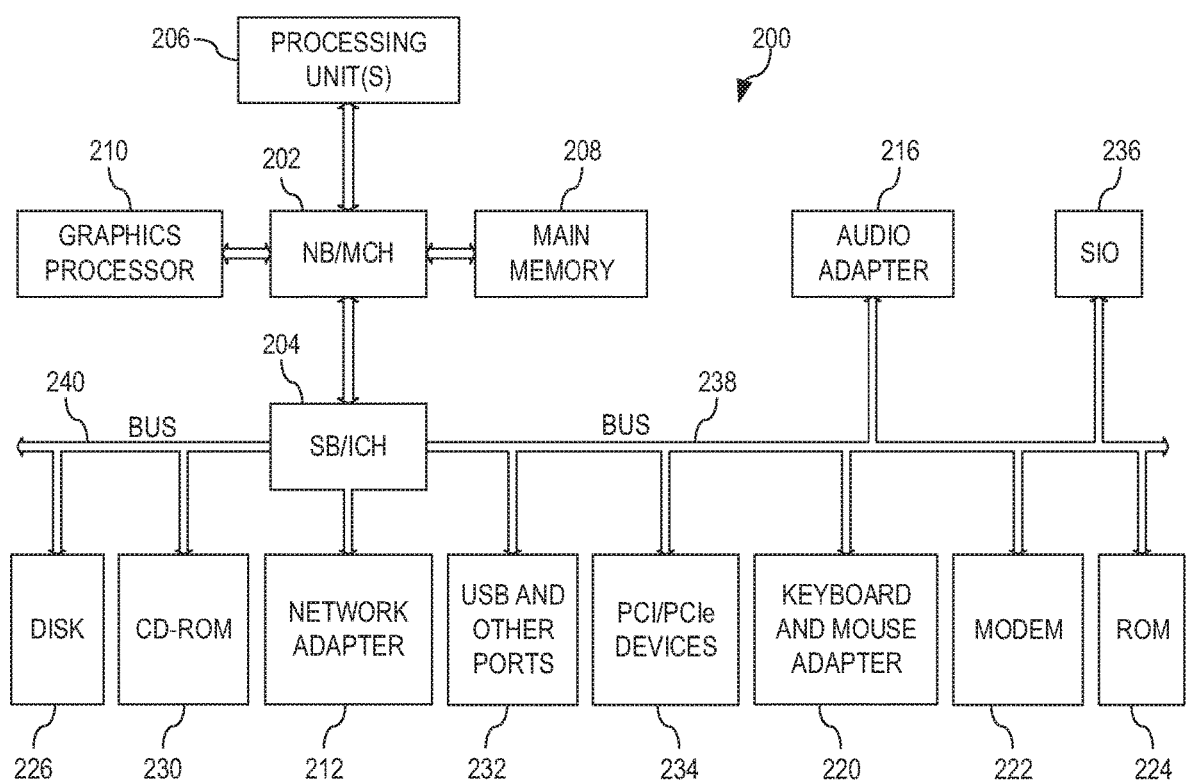
FIG. 2 is a block diagram of an example data processing system in which aspects of the illustrative embodiments are implemented.

The illustrative embodiments may be utilized in many different types of data processing environments. In order to provide a context for the description of the specific elements and functionality of the illustrative embodiments, FIGS. 1-2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

FIGS. 1-2 are directed to describing an example cognitive system for performing cognitive determinations regarding computing resource exposure and security response priority based on security trends in accordance with one illustrative embodiment. The example cognitive system implements a request processing pipeline, request processing methodology, and request processing computer program product with which the mechanisms of the illustrative embodiments are implemented. These requests may be provided as structure or unstructured request messages, natural language questions, or any other suitable format for requesting an operation to be performed by the cognitive system. As described in more detail hereafter, the particular application that is implemented in the cognitive system of the present invention is an application for evaluating an enterprise computing system infrastructure comprising one or more computing resources, or assets, with regard to dynamic determination of security vulnerabilities and dynamic determination of criticality or value of the computing resources of the enterprise computing system infrastructure, based on security trend analysis.

The cognitive system processes requests to evaluate the computing resources, e.g., software and/or hardware resources of computing devices, with regard to security vulnerabilities and enterprise criticality and/or value. The cognitive system processes such requests via a request processing pipeline that ingests information from a variety of different sources to identify content indicative of security vulnerabilities, the computing resources affected by such security vulnerabilities, and the potential security responses to such security vulnerabilities. These various sources may comprise informal sources of information such as websites, blogs, social networking sites, network accessible databases, internal enterprise databases, communications, logs, etc., and the like. A security trend analysis is performed on the ingested information to identify security vulnerabilities that warrant further evaluation by the cognitive system so that the dynamic security risk and security response priorities may be determined for a particular enterprise computing infrastructure.

In one illustrative embodiment, the security trend analysis may operate on ingested content from a variety of security intelligence sources (for example, Watson for Cyber, X-Force Exchange, and 3rd party intelligence sources (e.g., virus total, etc.)) as well as ingested content from the enterprise itself, also referred to as "local data," (for example, asset information (which is also leveraged as part of the asset characteristics measurements), log data, and incident data), where these are historical data sets that may be used in forecasting potential "trends." During ingestion of content from these sources, the illustrative embodiments annotate the content based on the timestamp associated with the content and an indication of compromise (IOCs) which classifies a specific vulnerability or exploit (e.g., IP addresses, source/destination attacking resources, file hashes, targets, etc.). The ingested content may further be classified if the threat/vulnerability/exploit has been seen before or not, i.e. known vs. unknown (e.g., all these characteristics=Petya malware). Using the ingested metadata, a time series forecasting calculation is performed to indicate a trend pattern of a particular vulnerability targeting a particular type of asset. The time series methodology employs neural networks that leverage the metadata as inputs and improves forecasting accuracy over time as "actual" events are fed back into the training model to improve accuracy.

The resulting identification of security risk and response priorities may be presented to a system administrator or other authorized individual, and/or may initiate automatic application of the security responses according to the determined priorities and the availability of the requirements for performing the security response, e.g., patches, updates, fixes, configuration changes, and the like. Of course a supervised semi-automatic application of security responses may also be utilized whereby the cognitive system may initiate automatic application of security responses with supervised human approval of one or more of the operations performed, e.g., via a graphical user interface mechanism where alerts or messages may be presented requesting human approval to proceed with the next operation in the security response.

As mentioned above, the illustrative embodiments make use of a cognitive system that performs cognitive operations to provide an intelligent evaluation of security risks and response so as to dynamically determine the security vulnerabilities of an enterprise infrastructure and the relative priorities of the security responses that are to be applied. As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding
Ingest and process vast amounts of structured and unstructured data
Generate and evaluate hypothesis
Weigh and evaluate responses that are based only on relevant evidence
Provide situation-specific advice, insights, and guidance
Improve knowledge and learn with each iteration and interaction through machine learning processes
Enable decision making at the point of impact (contextual guidance)
Scale in proportion to the task
Extend and magnify human expertise and cognition
Identify resonating, human-like attributes and traits from natural language
Deduce various language specific or agnostic attributes from natural language
High degree of relevant recollection from data points (images, text, voice) (memorization and recall)
Predict and sense with situational awareness that mimic human cognition based on experiences
Answer questions based on natural language and specific evidence In one aspect, cognitive systems provide mechanisms for processing requests via one or more request processing pipelines, where the requests themselves may be posed as natural language requests/questions and/or structured requests. In some cases, the requests may be implicit in the initiation of the operation of the cognitive system, i.e. a command may be sent to the cognitive system to initiate its operation given certain parameters, e.g., the identification of the enterprise to be evaluated and other input parameters.

The request processing pipeline or system is an artificial intelligence application executing on data processing hardware that processes requests pertaining to a given subject-matter domain. The request processing pipeline receives inputs from various sources including input over a network, a corpus of electronic documents or other data, data from a content creator, information from one or more content users, and other such inputs from other possible sources of input. Data storage devices, located local and/or remote to the cognitive system (but accessible via one or more data networks), store the corpus or corpora of data. Content creators, who may be human or automated processes, may create content in electronic documents for use as part of the corpus or corpora of data with the request processing pipeline. The documents may include any file, text, article, or other source of data for use in the request processing system. For example, a request processing pipeline may access a body of knowledge about the domain, or subject matter area, e.g., financial domain, medical domain, legal domain, etc., where the body of knowledge (knowledge-base) can be organized in a variety of configurations, e.g., a structured repository of domain-specific information, such as ontologies, or unstructured data related to the domain, or a collection of natural language documents about the domain. Again, examples of some types of documents which may be ingested and used by the cognitive system to facilitate processing of requests may include content of webpages, content of blogs, posts to forums or discussion groups, instant messages, trade publications, databases, or any other source of electronic information that is accessible via one or more collections of data representing structured and/or unstructured content.

Content users, which again may be human beings or automated processes of one or more computing devices, input requests to the cognitive system which implements the request processing pipeline. The request processing pipeline then processes the request and generates a result or desired output using the content in the corpus of data by evaluating documents, sections of documents, portions of data in the corpus, or the like. When a process evaluates a given section of a document for semantic content, the process can use a variety of conventions to query such document from the request processing pipeline, e.g., sending the query to the request processing pipeline as a well-formed query or question which is then interpreted by the request processing pipeline and a response is provided containing one or more results of the processing of the query and/or answers to the question. Semantic content is content based on the relation between signifiers, such as words, phrases, signs, and symbols, and what they stand for, their denotation, or connotation. In other words, semantic content is content that interprets an expression, such as by using Natural Language Processing.

In general, assuming a request that is presented as a natural language request or question, the request processing pipeline receives the input request, parses the request to extract the major features of the request, uses the extracted features to formulate queries, and then applies those queries to the corpus of data. Based on the application of the queries to the corpus of data, the request processing pipeline generates a set of hypotheses, or candidate responses/results to the input request, by looking across the corpus of data for portions of the corpus of data that have some potential for containing a valuable response to the input request. The QA pipeline then performs deep analysis on the language of the input request and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input request and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input request based on the specific area of focus of that reasoning algorithm. Each resulting score is then weighted against a statistical model. The statistical model captures how well the reasoning algorithm performed at establishing the inference between two similar passages for a particular domain during the training period of the request processing pipeline. The statistical model is used to summarize a level of confidence that the request processing pipeline has regarding the evidence that the potential response is inferred by the request. This process is repeated for each of the candidate responses/results until the request processing pipeline identifies candidate responses/results that surface as being significantly stronger than others and thus, generates a final result/response, or ranked set of results/responses, for the input request.

As mentioned above, request processing pipeline mechanisms operate by accessing information from a corpus of data or information (also referred to as a corpus of content), analyzing it, and then generating results based on the analysis of this data. Accessing information from a corpus of data typically includes: a database query that answers questions about what is in a collection of structured records, and a search that delivers a collection of document links in response to a query against a collection of unstructured data (text, markup language, etc.). The cognitive system is able to generate results/response to requests based on the corpus of data and the input request, verify results to a collection of requests for the corpus of data, correct errors in digital text using a corpus of data, and select results/responses to request from a pool of potential results/responses, i.e. candidate results/responses.

Content creators, such as article authors, electronic document creators, web page authors, document database creators, and the like, determine use cases for products, solutions, and services described in such content before writing their content. Consequently, the content creators know for which requests the content is intended to provide results/responses. Categorizing the requests, such as in terms of roles, type of information, tasks, or the like, associated with the request, in each document of a corpus of data allows the request processing pipeline to more quickly and efficiently identify documents containing content related to a specific query. The content may also provide results/responses to other requests that the content creator did not contemplate that may be useful to content users. The requests and results/responses may be verified by the content creator to be contained in the content for a given document. These capabilities contribute to improved accuracy, system performance, machine learning, and confidence of the request processing pipeline. Content creators, automated tools, or the like, annotate or otherwise generate metadata, as part of an ingestion operation for ingesting such content into a memory representation of the content for providing information useable by the request processing pipeline to identify the attributes of the content when applying queries and evaluating evidential support for candidate results/responses to requests.

Operating on such content, the request processing pipeline generates responses/results for input requests using a plurality of intensive analysis mechanisms which evaluate the content to identify the most probable results/responses, i.e. candidate results/responses, for addressing the input request. The most probable responses/results are output as a ranked listing of candidate responses/results ranked according to their relative scores or confidence measures calculated during evaluation of the candidate responses/results, as a single final result/response having a highest ranking score or confidence measure, or which is a best match to the input request, or a combination of ranked listing and final response/result.

For example, a request may be to evaluate the current prioritized security vulnerabilities of an identified enterprise infrastructure. The cognitive system and request processing pipeline of the illustrative embodiments may ingest documentation from one or more corpora comprising natural language portions of content that may conversationally or otherwise identify security breaches experienced by other enterprises to thereby identify attacks, the computing resources targeted by such attacks, and any responses to address such attacks that may have been used successfully or unsuccessfully by other enterprises. This information is ingested by the cognitive system, annotated by one or more general and/or domain specific annotators of the cognitive system to identify key portions of the content specific to the purpose of identifying security vulnerabilities in enterprise infrastructures, and used to process the request. It should be appreciated that such content may have been ingested prior to the receipt of the request and may already be present as an in-memory annotated representation of the content.

In addition, the cognitive system may utilize configured probes, agents, or the like, to gather information about the enterprise infrastructure in question, e.g., what computing resources are present in the enterprise infrastructure and their configurations, subjective criticality or value information associated with the various computing resources based on the particular enterprise infrastructure implementation, general and/or enterprise specific temporal criticality or value information for the various computing resources of the enterprise infrastructure, and the like. This is referred to collectively as enterprise infrastructure information. The request processing pipeline may then evaluate the security vulnerability information along with the enterprise infrastructure information associated with the enterprise infrastructure in question to determine a ranked listing, or prioritized listing, of security vulnerabilities specific to the enterprise infrastructure in question. The resulting ranked listing may be presented to a human system administrator or other authorized personnel and/or used to initiated automated or semi-automated security responses, e.g., applying patches to software, changing configurations of software/hardware assets, and the like.

FIG. 1 depicts a schematic diagram of one illustrative embodiment of a cognitive system 100 implementing a request processing pipeline 108 in a computer network 102. For purposes of the present description, it will be assumed that the request processing pipeline 108 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. For purposes of illustration only, FIG. 1 depicts the cognitive system 100 being implemented on a single computing device 104 only, but as noted above the cognitive system 100 may be distributed across multiple computing devices, such as a plurality of server computing devices 104. The network 102 includes multiple computing devices 104, 132 which may operate as server computing devices, and multiple computing devices 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 enables request processing functionality for one or more cognitive system users via their respective computing devices 110-112. In other embodiments, the cognitive system 100 and network 102 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, sub-systems, and/or devices other than those that are depicted herein.

The cognitive system 100 is configured to implement a request processing pipeline 108 that receive inputs from various sources. The requests may be posed in the form of a natural language question, natural language request for information, natural language request for the performance of a cognitive operation, an automated initiation of the operation of the cognitive system to evaluate an enterprise infrastructure, a user input structured request, such as a structured request specifying input parameters for the operation of the cognitive system, or the like. For example, the cognitive system 100 receives input from the network 102, a corpus or corpora of electronic documents 106 and/or 150, cognitive system users, and/or other data and other possible sources of input. In one embodiment, some or all of the inputs to the cognitive system 100 are routed through the network 102. The various computing devices 104 implementing the cognitive system 100 on the network 102 include access points for content creators and cognitive system users. Some of the computing devices 104 include devices for a database storing the corpus or corpora of data 106 (which is shown as a separate entity in FIG. 1 for illustrative purposes only) and/or corpus 150. Portions of the corpus or corpora of data 106, 150 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus or corpora of data 106, 150 for use as part of a corpus of data with the cognitive system 100. The document includes any file, text, article, or source of data for use in the cognitive system 100. Cognitive system users, which again may be human users and/or automated processes executing on the computing devices 110, 112, or other computing devices associated with the network 102, access the cognitive system 100 via a network connection or an Internet connection to the network 102, and input requests to the cognitive system 100 that are processed based on the content in the corpus or corpora of data 106, 150. In one embodiment, the requests are formed using natural language. The cognitive system 100 parses and interprets the request via a pipeline 108, and provides a response to the cognitive system user, e.g., cognitive system user via computing device 110, containing one or more responses/results to the request, or the like. In some embodiments, the cognitive system 100 provides a response to users in a ranked list of candidate responses while in other illustrative embodiments, the cognitive system 100 provides a single final response or a combination of a final response and ranked listing of other candidate responses.

The cognitive system 100 implements the pipeline 108 which comprises a plurality of stages for processing an input request based on information obtained from the corpus or corpora of data 106, 150. The pipeline 108 generates responses for the input request based on the processing of the input request and the corpus or corpora of data 106, 150.

In some illustrative embodiments, the cognitive system 100 may be the IBM Watson™ cognitive system available from International Business Machines Corporation of Armonk, N.Y., which is augmented with the mechanisms of the illustrative embodiments described hereafter. In such an embodiment, the pipeline 108 of the IBM Watson™ cognitive system 100 comprises a plurality of stages of logic for processing the request and corpus or corpora of information to generate results or responses to the request. This plurality of stages comprises one or more stages of logic that receive an input request which is then parsed to extract the major features of the request, which in turn is used by other stages of the pipeline 108 to formulate queries that are applied to the corpus or corpora of data 106, 150. Based on the application of the queries to the corpus or corpora of data 106, in further stages of the pipeline 108, a set of hypotheses, or candidate responses to the input request, are generated by looking across the corpus or corpora of data 106, 150 for portions of the corpus or corpora of data 106, 150 that have some potential for containing a valuable response to the input request.

The pipeline 108 of the IBM Watson™ cognitive system then performs deep analysis on the input request and the portions of the corpus 106 found during the application of the queries using a variety of reasoning algorithms. In further stages of the pipeline 108, the scores obtained from the various reasoning algorithms are then weighted against a statistical model that summarizes a level of confidence that the pipeline 108 of the IBM Watson™ cognitive system 100, in this example, has regarding the evidence that the potential candidate response/result is inferred by the question. This process is repeated for each of the candidate responses/results to generate a ranked, or prioritized, listing of candidate responses/results which may then be presented to the user that submitted the input request or from which a final response/result is selected and presented to the user. More information about the pipeline 108 of the IBM Watson™ cognitive system 100 may be obtained, for example, from the IBM Corporation website, IBM Redbooks, and the like. For example, information about the pipeline of the IBM Watson™ cognitive system can be found in "The Era of Cognitive Systems: An Inside Look at IBM Watson and How it Works" by Rob High, IBM Redbooks, 2012.

As noted above, while the input to the cognitive system 100 from a client device may be posed in the form of a natural language request, the illustrative embodiments are not limited to such. Rather, the input request may in fact be formatted or structured as any suitable type of request which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis.

As shown in FIG. 1, the cognitive system 100 is further augmented, in accordance with the mechanisms of the illustrative embodiments, to include and/or operate with logic implemented in specialized hardware, software executed on hardware, or any combination of specialized hardware and software executed on hardware, for implementing a security vulnerability analysis engine 120 and its corresponding logic modules and data structures 122-132. For example, in some illustrative embodiments, various ones of the stages of the pipeline 108 may be integrated with selected ones of the elements 122-132 of the security vulnerability analysis engine 120 to facilitate performance of the stage logic's operations specifically with regard to security vulnerability analysis of a specified enterprise infrastructure, e.g., various ones of the elements 122-124 may operate as part of, or in conjunction with, a query processing stage of the pipeline 108 to query content ingested from one or more corpora 106, 150 to identify security vulnerability trends based on externally obtained information from a variety of different content sources, e.g., webpages, forums, blogs, databases, etc. Similarly, as a further example, various ones of elements 126-132 may operate as part of, on in conjunction with, a hypothesis generation stage of the pipeline 108 in order to apply the results of the queries to a specific enterprise infrastructure, criticality/value, and temporal characteristics to generate candidate responses/results.

The security vulnerability analysis engine 120 operates in response to requests received by the cognitive system 100, which may be user initiated requests from users operating client computing devices 110, 112, automatically generated requests from applications or other processes operating on computing devices 110, 112, and/or server computing devices associated with an enterprise infrastructure environment 140, requests generated according to an automation schedule, or the like. Moreover, in some illustrative embodiments, the requests may in fact be inferred rather than explicit requests, where the inferred requests may simply be a collection of input parameters including an identifier of the enterprise infrastructure environment 140 for which the operation of the cognitive system 100 may be invoked. Thus, for example, periodically, continuously, or in accordance with a schedule, the cognitive system 100 may dynamically perform its operations regarding the enterprise infrastructure environment 140 to present notifications to system administrators and/or perform automatic or semi-automatic security responses to security vulnerabilities identified by the security vulnerability analysis engine 120 of the cognitive system 100. In some illustrative embodiments, when changes occur to the corpus or corpora 106, 150, the change may instigate the performance of the security vulnerability identification and security response prioritization of one or more of the illustrative embodiments.

The content ingestion and annotation logic 122 provides logic for ingesting content from the corpus or corpora 106, 150 and annotating portions of the content to identify elements specific to attacks or security vulnerabilities, the computing resources or types of computing resources targeted by such attacks or security vulnerabilities, and/or any security responses and their success/failure to address the attacks or security vulnerabilities. Again, this information may come from informal sources, such as webpages, websites, forums, instant messages, databases, and the like. For example, users may post messages to forums discussing a security vulnerability found in a particular type of firewall employed by another enterprise and may specify particular types of attacks, particular computing resources that the attacks have targeted, and the particular patch, configuration change, or other fix performed to address the attack. This information may be ingested and annotated by the content ingestion and annotation logic 122 to generate annotated security vulnerability content 123 that is stored for use by other elements of the security vulnerability analysis engine 120.

The security trend analysis logic 124 performs security trend analysis on the annotated security vulnerability content 123 to determine the dynamically current security vulnerabilities that are prominently present in the ingested content. Such security trend analysis may look to various characteristics of the ingested content 123 to relatively rank security vulnerabilities. For example, the number of instances that a particular security vulnerability is identified in the ingested content may be evaluated, the temporal characteristics of sources of content may be evaluated to identify the more recent instances of security vulnerabilities, etc., to relatively rank or prioritize security vulnerabilities.

The enterprise probe logic 126 operates to utilize a probe 127, which is an application executed by one or more computing devices of the enterprise infrastructure environment 140 to gather information about the computing resources present in the enterprise infrastructure environment 140. For example, the probe 127 may be implemented as agent applications loaded into the computing devices 142-148 of the enterprise infrastructure environment 140 and executed to gather computing resource information and the particular configuration information for the computing resources of the enterprise infrastructure environment 140. The enterprise probe logic 126 interfaces with these probe(s) 127 to gather this information and store it as an enterprise computing resource and configuration model 125.

The criticality/value and temporal sensitivity data store 128 stores information specific to the enterprise, or type of enterprise, regarding the criticality/value of computing resources in the enterprise infrastructure environment 140 and the temporal sensitivity of this criticality/value of computing resources to the operation of the enterprise infrastructure environment 140. The criticality/value information specifies, for a particular enterprise, the subjective determination of criticality/value of computing resources, e.g., hardware/software computing resources such as computing devices 142-148 and/or the applications and data present on these computing devices 142-148, to the overall operation of the enterprise infrastructure environment 140. The temporal sensitivity information, for example, specifies at what times of the day, week, month, year, etc., the criticality/value of the various computing resources change, e.g., payroll server 146 may be more critical during the second and last week of each month and less critical at other times, the e-commerce web server 142 is more critical at specific times of the day where historically traffic has been determined to surge, e.g., in the evenings when people are home from work, than other times, e.g., when people are at work and should not be making personal purchases. In some illustrative embodiments, the criticality/value and temporal sensitive data store 128 may obtain information from maintenance history data structures maintained by the computing resources of the enterprise infrastructure environment 140, patch or fix history information, and the like, to determine criticality/value based on historical maintenance of the computing resources.

The criticality/value evaluation logic 130 evaluates the criticality/value and temporal sensitivity to identify and score the criticality/value of each computing resource present in the enterprise infrastructure environment 140 with regard to one or more criticality/value characteristics. For example, the characteristics may include mission and customer impact, safety and environmental impact, ability to isolate single point failures, preventative maintenance, corrective maintenance history, meant time between failures or "reliability," probability of failure, spares lead time, asset replacement value, and planned utilization rate. These characteristics may be scored based on a predetermined scale, e.g., 1 to 10, and the aggregation of the characteristics may be used to provide an overall score for the particular computing resource.

The dynamic security vulnerability and response priority logic 132 evaluates the criticality/value of the various computing resources and the security trends identified by the security trend analysis logic 124 to identify a ranked or prioritized listing of the security vulnerabilities and corresponding security responses that are applicable to the enterprise infrastructure environment 140 for the current dynamic conditions of the enterprise infrastructure environment 140. The dynamic security vulnerability and response priority logic 132 may evaluate the various criticality/value characteristics of the computing resources, the temporal sensitivities, and user inputs associated with the original request to adjust any of these criticality/value characteristics, and the like, as well as the relative rankings of security vulnerabilities associated with the computing resources, the availability of patches, fixes, configuration changes, and the like, to address the security vulnerabilities, and the like, to generate an overall ranking or prioritization of the security vulnerabilities and their corresponding security responses. Thus, the output of the dynamical security vulnerability response priority logic is a model of security vulnerability and response priority that is specific to the particular enterprise infrastructure environment 140 and specific to the current security trends and temporal characteristics.

The dynamic security vulnerability and response priority logic 132 may present a graphical user interface that outputs the top X security vulnerabilities and corresponding suggested security responses for these security vulnerabilities, e.g., the patches, fixes, configuration changes, etc., that may be used to reduce the risks associated with the security vulnerability. In some illustrative embodiments, and for some security vulnerabilities, the corresponding security responses may be automatically or semi-automatically applied to the corresponding computing resources 142-148 and/or their applications, in response to the generation of the prioritized listing of security vulnerabilities. In still some illustrative embodiments, the graphical user interface may comprise user input elements for adjusting criticality/value factors to be applied to various aspects of the computing resources 142-148 of the enterprise infrastructure environment 140. For example, a user may use graphical user interface elements to adjust the scores or weightings applied to scores of individual criticality/value characteristics of computing resources or types of computing resources so as to determine the impact on security vulnerability and response prioritization.

Thus, the security vulnerability analysis engine 120 determines security risk and security response priority based on security trend analysis, such as may be performed by the security trend analysis logic 124, performed on a variety of external and internal information sources, i.e. corpus 106, 150 and/or other enterprise data obtained from the enterprise infrastructure environment 140 itself, and/or users specifying criteria, such as criticality/value criteria, temporal criteria, and the like, specific to the enterprise infrastructure environment 140. The security trend analysis leverages industry specific threats focused on the sector of the associated enterprise corresponding to the enterprise infrastructure environment 140. The mechanisms of the illustrative embodiments evaluate indicators of compromise from various security vulnerabilities identified via the security trend analysis performed on collections of external source information, e.g., x-force exchange or other external sources of structured/unstructured data, and internal source information, e.g., private corpus of structured/unstructured data, which may be provided in corpora 106, 150, for example.

The cognitive system 100 implementing the pipeline 108 and security vulnerability analysis engine 120 evaluates the structured/unstructured data to identify trends in security vulnerabilities and exploits, as well as the attacks that take advantage of these vulnerabilities and exploits as discussed above. Such information that may be extracted from the natural language content by the content ingestion and annotation logic 122 includes, but is not limited to, attack identifiers, computing resources targeted by the attacks, effects of the attacks, indications of patches or fixes for thwarting such attacks, and the like. This information may be periodically or continuously collected by the content ingestion and annotation logic 122 and evaluated by the security trend analysis logic 124 to identify the current trends in security vulnerabilities and attacks on computing system resources so as to be as pro-active as possible to address such threats.

With the mechanisms of the security vulnerability analysis engine 120 implemented in the cognitive system 100, the enterprise probe logic 126 may operate on information collected by one or more probes 127 to dynamically generate a model 125 of the enterprise infrastructure environment 140 to determine the particular types of computing resources, e.g., computing devices 142-148 and/or applications/data present on these computing devices, that may be at risk of a currently trending attack or security vulnerability to the enterprise. The model 125 may be used to generate a predictive model of the security vulnerabilities and responses specific to the enterprise infrastructure environment 140 based on data breaches and attack statistics of success/failures (systems of record) from the enterprise itself and other mined data sources, as well as hacking trends and attack vectors identified (system of operations) from analysis of electronic content from various sources, e.g., open Internet sources, the dark web, and other unstructured data sources.

The logic 126-132 further operates as noted above to classify computing system resources 142-148 (and other computing resources such as applications, data structures, and the like, which may be present on one or more of the computing devices) in the enterprise infrastructure environment 140, as to their overall enterprise value or criticality to the enterprise by scoring computing resources based on a number of enterprise characteristics that determine the value of the computing resource to the functioning or business of the enterprise. The particular enterprise characteristics considered may take many different forms depending on the desired implementation. In one illustrative embodiment, as noted above, the enterprise characteristics may include such characteristics as mission and customer impact, safety and environmental impact, ability to isolate single-point-failures, preventative maintenance history, corrective maintenance history, mean time between failures (MTBF) or "reliability," probability of failure, spares lead time, asset replacement value, planned utilization rate, and the like.

These enterprise criticality/value characteristics may be quantified along predetermined scales. A weighted evaluation of these enterprise criticality/value characteristics may further be performed as well, where certain characteristics are more heavily weighted than others depending on the desired implementation, e.g., depending on the computing resource, safety and environmental impact may be more highly weighted than, for example, corrective maintenance history. Again, these weightings may be adjusted via a graphical user interface to see the impact on the prioritization of security vulnerabilities and responses by adjusting the overall evaluation of security vulnerability and response priorities for computing resources.

In some illustrative embodiments, an enterprise computing resource model is generated by the dynamic security vulnerability and response priority logic 132 that defines various types of computing resources and the particular enterprise characteristic values associated with the computing resource types, and their associated security vulnerabilities and security responses for addressing such security vulnerabilities, along with current dynamically determined priorities of such. For example, a computing resource type of "e-commerce internet facing server" may be defined with a plurality of enterprise characteristics having associated characteristic values. The enterprise characteristic values may be determined based on a default value set associated with general computing resource types. The default values may then be modified by the criticality/value evaluation logic 130 for the particular enterprise for which the security exposure evaluation is being performed based on the criticality/value and temporal sensitivity data 128. The dynamic security vulnerability and response priority logic 132 may generate the enterprise computing resource model based on the criticality/value evaluation logic 130 results and the enterprise computing resource and configuration model 125. The dynamic security vulnerability and response priority logic 132 may also provide a user interface through which a system administrator of the enterprise may adjust the enterprise characteristic values associated with these various computing resource types to make them specific to a particular enterprise and/or determine the effect of different criticality/value characteristics for different types of computing resources.

In some illustrative embodiments, automated mechanisms are provided in the dynamic security vulnerability and response priority logic 132 for evaluating the enterprise characteristic values associated with enterprise characteristics for specific instances of computing resources in the enterprise computing resource and configuration model 125 of the particular enterprise. For example, with these automated mechanisms, a user may identify a given industry classification of the enterprise which may then be used to retrieve the default pre-defined set of enterprise computing resources, and enterprise characteristic values for enterprise characteristics for the various enterprise computing resources, for the particular industry classification, e.g., for an e-commerce web service, customer facing computing resources are more important than perhaps backend computing resources, such as switches, routers, etc. The mechanisms of the illustrative embodiments may then scan the enterprise infrastructure environment 140 of the enterprise, such as by using enterprise probe logic 126 and one or more probes 127, and identify computing system resources 142-148 that are linked to or associated with the defined industry type of the enterprise specified by the user. The mechanisms of the illustrative embodiments may further take into consideration the relative value placed on the various computing resource types and/or individual specific computing resource instances by the system administrator and/or other individuals associated with the enterprise, e.g., the criticality/value and temporal sensitivity data in store 128. Moreover, the mechanisms may further take into consideration whether particular computing resources are protecting other computing resources that are considered high value, e.g., a firewall 144 protecting a high value computing resource such as payroll server 146. Furthermore, the mechanisms of the illustrative embodiments may evaluate the incident tickets from service management systems, asset monitoring, etc., to determine and pre-populate scores for such characteristics as MTBF, failure probability, and maintenance history, for example. The result of this evaluation is a set of enterprise characteristic values for each of the identified computing system resources 142-148 found in an enterprise infrastructure environment 140.

The combination of the enterprise characteristic values together represent an overall enterprise value or criticality of the computing resource 142-148 to the enterprise infrastructure environment 140. This overall enterprise value or criticality may change with time and thus, a particular computing resource 142-148 may be more or less valuable to the enterprise environment at certain time periods, e.g., certain times of the day, week, month, year, etc. For example, payroll computing resources 146 may be considered more valuable or critical to the functionality of the enterprise environment at the middle and end of each calendar month, employee networking resources may be more valuable or critical during the middle of the day on weekdays and less value or critical on weekends or in the evenings. Thus, with the mechanisms of the illustrative embodiments, temporal characteristics may be included in the evaluation of the current enterprise value or criticality of a computing resource.

Moreover, computing resource change histories and schedules may be evaluated by the dynamic security vulnerability and response priority logic 132 to determine levels of security risk associated with the computing resources 142-148. For example, for computing resources that have recently undergone a change for security vulnerability purposes, their risk assessment may be lowered as they are less vulnerable to attack, with the opposite also being true for computing resources that have not been changed or updated recently. For computing resources that have a scheduled change, update, or patch in the near future, the same is also true. This evaluation may be included with an evaluation of the security risk of particular types of computing resources as determined from the natural language processing and cognitive system analysis of external and internal information as discussed above, to identify a security risk assessment for various types of computing resources associated with the given enterprise environment.

Thus, both a security risk assessment is generated by the security trend analysis logic 124 from a variety of sources based on a cognitive analysis of natural language information sources, and an enterprise value or criticality of the various computing resources is generated by the elements 126-132 taking into account various enterprise characteristics, baseline or default characteristic values, specific user defined modifications to the default characteristic values, relative priority or value of instances of the computing resources in the enterprise environment and the computing resources they are protecting (if applicable), as well as temporal characteristics and maintenance history information. The combination of the security risk assessment and the enterprise value or criticality is used to generate an indicator of compromise which indicates a potential seriousness of a security vulnerability of one or more computing resources 142-148 to the enterprise according to current information and the enterprise infrastructure environment 140, taking into account temporal factors as well. This indicator of compromise may be updated dynamically by dynamically performing the evaluations discussed above.

The indicators of compromise for each of the computing resources may be used to relatively rank these security vulnerabilities associated with the computing resources relative to one another and present a representation of the relative severity of the potential security vulnerabilities to a system administrator or other authorized individual via notifications and/or one or more graphical user interfaces generated by the dynamic security vulnerability and response priority logic 132. Moreover, in some illustrative embodiments, the indicators of compromise may be used to perform a lookup operation for patches, updates, or other fixes that are associated with the computing system resource 142-148 that is affected by the corresponding security vulnerability. These patches, updates, or other fixes, if possible, may then be automatically applied to the computing resource 142-148 by the dynamic security vulnerability and response priority logic 132, or applied in a semi-automatic manner based on human authorizations prior to proceeding, so as to harden the computing resources 142-148 against the corresponding potential attacks. For those patches, updates, configuration changes, firewall rules changes, or other fixes that are not able to be automatically applied, a corresponding notification may be generated and sent to the system administrator or other authorized individual so that they may take steps to implement the patches, updates, configuration changes, firewall rules changes, or other fixes.

Thus, the illustrative embodiments provide mechanisms for dynamically identifying security vulnerabilities based on security vulnerability trend analysis using a variety of sources of information both internal and external to the enterprise infrastructure environment being evaluated. The illustrative embodiments provide mechanisms for prioritizing such security vulnerabilities based on the results of the trend analysis and criticality/value information provided for particular computing resources and/or types of computing resources that are present in the enterprise infrastructure environment, where this criticality/value information may be specific to the particular industry of the enterprise and/or the particular enterprise in question. Moreover, the criticality/value information may be adjusted based on temporal factors specific to the industry and/or particular enterprise in question, as well as the current temporal conditions being evaluated. The ranked or prioritized listing of security vulnerabilities specific to the enterprise infrastructure environment may then be used to drive security responses either manually, automatically, or semi-automatically performed.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

As discussed above, the dynamic security vulnerability and response priority logic 132 operates on criticality/value information stored in the criticality/value and temporal sensitivity data store 128 to generate a model of the enterprise infrastructure environment 140. The criticality/value information may be provided as data structures specifying one or more criticality/value characteristics which may then be adjusted based on temporal criteria and associated with instances of computing resources found by enterprise probe logic 126 and represented in the enterprise computing resource and configuration model 125.

FIG. 3 is an example diagram of a data structure for a particular instance of a computing resource present in the enterprise infrastructure environment. There may be a separate data structure of this type for each instance of a computing resource found in the enterprise infrastructure environment. As shown in FIG. 3, the data structure comprises an identifier of the particular instances of the computing resource 310, a description or type of the computing resource 320, and a plurality of criticality/value characteristics 330-348. In this example embodiment, the criticality/value characteristics 330-348 include mission and customer impact 330, safety and environmental impact 332, ability to isolate single-point failures 334, preventative maintenance history 336, corrective maintenance history 338, mean time between failures or "reliability" 340, probability of failure 342, spares lead time 344, asset replacement value 346, and planned utilization rate 348. Each of these criticality/value characteristics has a corresponding score on a predetermined scale, which in this example is a scale from 1 to 10 with 10 being more critical than a score of 1. The scores themselves are generated by statistically comparing a best practices or industry standard to the quantification method. This identified value may then be converted to an appropriate scale, e.g., 1-10 in this example.

Figure 4:
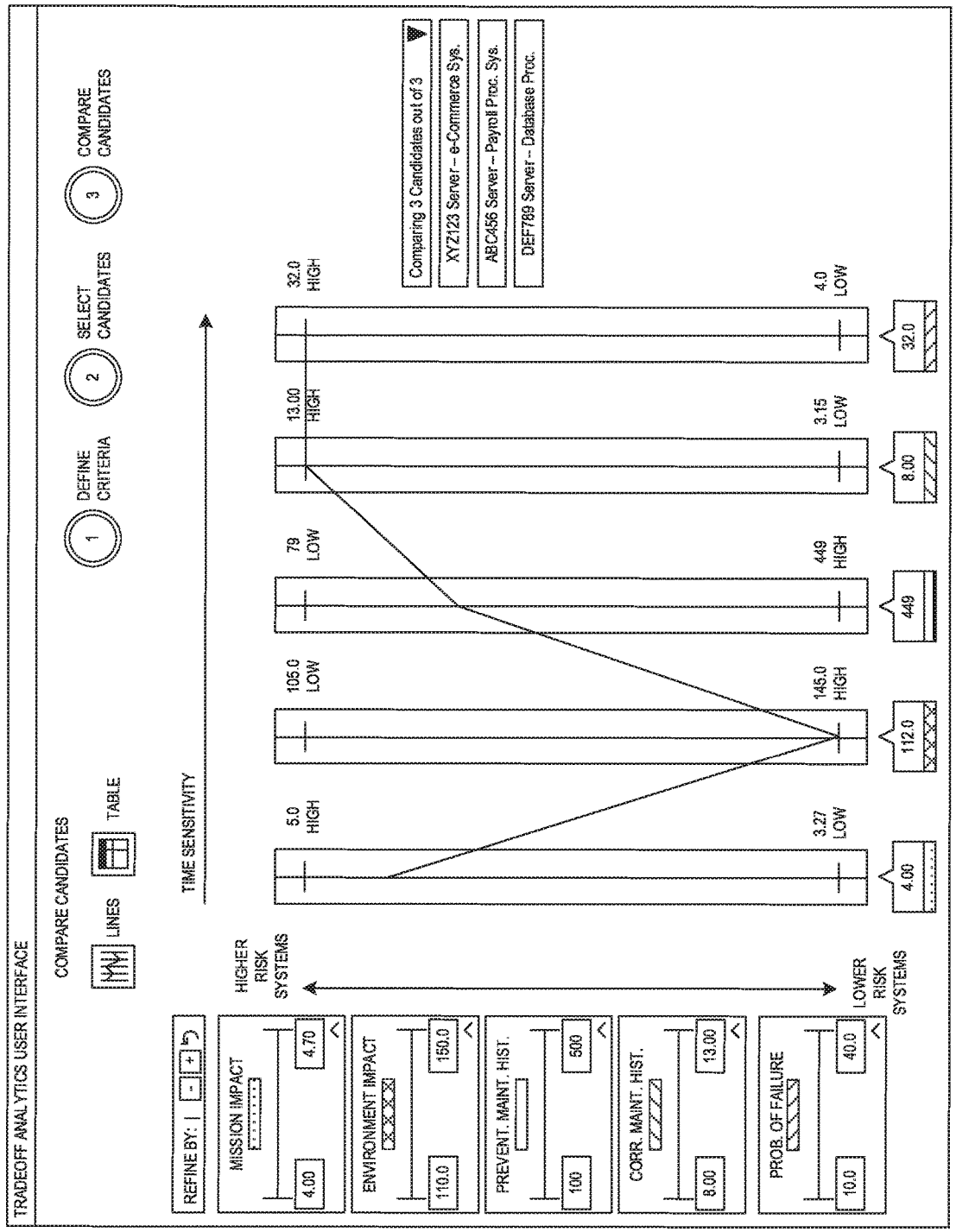
FIG. 4 is an example diagram illustrating a graphical user interface through which such selections and/or modifications may be performed.

As mentioned previously, in some illustrative embodiments, the dynamic security vulnerability and response priority logic 132 may provide a user interface through which a user may select and/or modify the criticality/value characteristic values and identify the effects generated on the prioritization of security vulnerabilities by the modifications. FIG. 4 is an example diagram illustrating a graphical user interface through which such selections and/or modifications may be performed. The graphical user interface set forth in FIG. 4 illustrates one example output according to one illustrative embodiment where the left side of the diagram illustrates derived output of the risk evaluation values. Based on these values, trending, and time considerations, the illustrative embodiment produces candidate assets that require attention in priority order. The user may, if desired, alter the risk evaluation values manually using this graphical user interface to perform a "trade-off" analysis to determine how altering these values impacts the asset prioritization and them make a recommendation from the modified values as to security responses to be performed.

Figure 5:
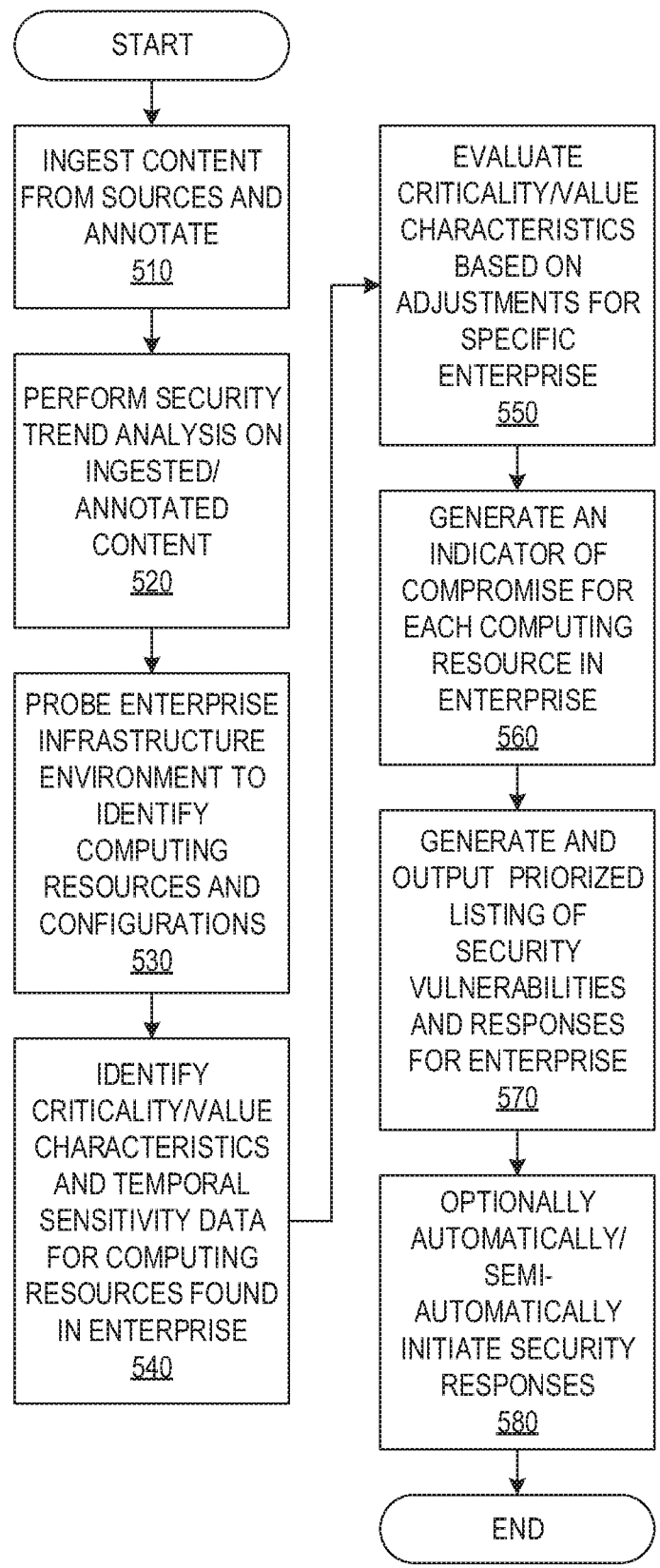
FIG. 5 is a flowchart outlining an example operation of a security vulnerability analysis engine in accordance with one illustrative embodiment.

FIG. 5 is a flowchart outlining an example operation of a security vulnerability analysis engine in accordance with one illustrative embodiment. As shown in FIG. 5 the operation starts by ingesting content from a plurality of different external and/or internal information sources and annotating instances of terms/phrases or other portions of content that reference security vulnerabilities for computing resources to generate annotated security vulnerability content (step 510). A security trend analysis is performed on the annotated security vulnerability content to relatively rank security vulnerabilities as to their prevalence, timeliness, importance, and the like, of these security vulnerabilities in currently available content from these information sources (step 520). A particular enterprise infrastructure environment is probed to collect computing resource information, configuration information, and the like, detailing the particular arrangement of the enterprise infrastructure environment and thereby generate an enterprise computing resource and configuration model (step 530).

Criticality/value characteristics and temporal sensitivity data for the computing resources identified in the enterprise infrastructure environment (step 540). The criticality/value characteristics and temporal sensitivity data is evaluated based on specific adjustments for the particular enterprise to generate adjusted criticality/value characteristics for the instances of computing resources in the enterprise infrastructure environment (step 550). For each computing resource, an indicator of compromise is calculated based on a combination of the values of the various criticality/value characteristics and any current temporal conditions to generate a security vulnerability model of the computing resources in the enterprise infrastructure environment (step 560). Based on the security vulnerability model, a ranked or prioritized listing of security vulnerabilities and their corresponding security responses, e.g., patches, fixes, configuration changes, etc., for presentation to a system administrator or other authorized individual via one or more graphical user interfaces (step 570). In some cases, the security responses may be automatically, or semi-automatically, initiated so as to automatically, or semi-automatically, address the most critical security vulnerabilities (step 580). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, the memory comprising instructions that are executed by the processor to specifically configure the processor to implement a security vulnerability analysis engine, the method comprising:
   ingesting, by the security vulnerability analysis engine executing in the data processing system, content from a plurality of content source computing devices to identify instances of security vulnerability content in the ingested content;
   performing, by the security vulnerability analysis engine, a security trend analysis on the instances of security vulnerability content to identify a relative ranking of security vulnerabilities;
   identifying, by the security vulnerability analysis engine, computing resources of a specified computing infrastructure and a criticality of the computing resources to an operation of the computing infrastructure;
   generating, by the security vulnerability analysis engine, a prioritized listing of security vulnerabilities associated with the computing infrastructure based on the relative ranking of security vulnerabilities and the criticality of the computing resources in the computing infrastructure; and
   outputting, by the security vulnerability analysis engine, a notification to a user via a user computing device, indicating the prioritized listing of security vulnerabilities, wherein identifying a criticality of the computing resources to an operation of the computing infrastructure comprises:
   evaluating each computing resource of the computing infrastructure with regard to a plurality of criticality factors; and
   ranking the computing resources relative to one another based on results of evaluating the computing resources with regard to the plurality of criticality factors, and wherein the plurality of criticality factors comprise at least one of mission and customer impact, safety and environmental impact, ability to isolate single-point failures, preventative maintenance history, corrective maintenance history, mean time between failures, probability of failure, spares lead time, asset replacement value, or planned utilization rate.

2. The method of claim 1, wherein the plurality of content source computing devices comprises at least one content source computing device external to an enterprise associated with the computing infrastructure, and at least one content source computing device internal to the enterprise associated with the computing infrastructure.

3. The method of claim 1, wherein ingesting the content from the plurality of content source computing devices comprises performing natural language processing on the content to identify terms/phrases referencing security vulnerabilities in natural language content of the content from the plurality of content source computing devices.

4. The method of claim 1, further comprising generating a predictive model based on results of the security trend analysis, wherein the predictive model operates to predict a likeliness that particular types of computing resources in the computing infrastructure represent a security vulnerability.

5. The method of claim 1, wherein evaluating each computing resource of the computing infrastructure with regard to the plurality of criticality factors comprises:

receiving, by the security vulnerability analysis engine from a client computing device, an input specifying an industry classification of an enterprise associated with the computing infrastructure;

retrieving, by the security vulnerability analysis engine, a default model of a default computing infrastructure for the specified industry classification, wherein the default model comprises default values for the plurality of criticality factors for each of a plurality of default computing resources;

performing, by the security vulnerability analysis engine, a scan of the computing infrastructure to identify computing resources present in the computing infrastructure that correspond to default computing resources in the default model and associating corresponding default values of the plurality of criticality factors to the corresponding computing resource; and for one or more computing resources identified in the computing infrastructure that corresponds to a default computing resource in the default model, modifying the default values of the criticality factors based on at least one of user specified adjustments, a determination of whether the computing resource is protecting other computing resources in the computing infrastructure, or an evaluation of incident tickets from service management systems associated with the computing resource.

6. The method of claim 1, further comprising:
performing a lookup operation for a security response to security vulnerabilities in the prioritized listing of security vulnerabilities; and
outputting, by the security vulnerability analysis engine, an indication of security responses to the security vulnerabilities specified in the prioritized listing as part of the notification.

7. The method of claim 1, further comprising:
performing a lookup operation for a security response to security vulnerabilities in the prioritized listing of security vulnerabilities; and
automatically applying the security responses to the corresponding security vulnerabilities in the prioritized listing of security vulnerabilities.

8. The method of claim 7, wherein the security response comprises at least one of applying a patch to software, applying an update to software, changing configuration parameters associated with a computing resource, or changing firewall rules of a computing resource.

9. A computer program product comprising a computer readable storage medium having a computer readable program stored therein, wherein the computer readable program, when executed on a computing device, causes the computing device to execute a security vulnerability analysis engine that operates to:
ingest content from a plurality of content source computing devices to identify instances of security vulnerability content in the ingested content;
perform a security trend analysis on the instances of security vulnerability content to identify a relative ranking of security vulnerabilities;
identify computing resources of a specified computing infrastructure and a criticality of the computing resources to an operation of the computing infrastructure;
generate a prioritized listing of security vulnerabilities associated with the computing infrastructure based on the relative ranking of security vulnerabilities and the criticality of the computing resources in the computing infrastructure; and
output a notification to a user via a user computing device, indicating the prioritized listing of security vulnerabilities, wherein identifying a criticality of the computing resources to an operation of the computing infrastructure comprises:
evaluating each computing resource of the computing infrastructure with regard to a plurality of criticality factors; and
ranking the computing resources relative to one another based on results of evaluating the computing resources with regard to the plurality of criticality factors, and wherein the plurality of criticality factors comprise at least one of mission and customer impact, safety and environmental impact, ability to isolate single-point failures, preventative maintenance history, corrective maintenance history, mean time between failures, probability of failure, spares lead time, asset replacement value, or planned utilization rate.

10. The computer program product of claim 9, wherein the plurality of content source computing devices comprises at least one content source computing device external to an enterprise associated with the computing infrastructure, and at least one content source computing device internal to the enterprise associated with the computing infrastructure.

11. The computer program product of claim 9, wherein the computer readable program further causes the security vulnerability analysis engine to ingest the content from the plurality of content source computing devices at least by performing natural language processing on the content to identify terms/phrases referencing security vulnerabilities in natural language content of the content from the plurality of content source computing devices.

12. The computer program product of claim 9, wherein the computer readable program further causes the security vulnerability analysis engine to generate a predictive model based on results of the security trend analysis, wherein the predictive model operates to predict a likeliness that particular types of computing resources in the computing infrastructure represent a security vulnerability.

13. The computer program product of claim 9, wherein the computer readable program further causes the security vulnerability analysis engine to evaluate each computing resource of the computing infrastructure with regard to the plurality of criticality factors at least by:
receiving, by the security vulnerability analysis engine from a client computing device, an input specifying an industry classification of an enterprise associated with the computing infrastructure;
retrieving, by the security vulnerability analysis engine, a default model of a default computing infrastructure for the specified industry classification, wherein the default model comprises default values for the plurality of criticality factors for each of a plurality of default computing resources;
performing, by the security vulnerability analysis engine, a scan of the computing infrastructure to identify computing resources present in the computing infrastructure that correspond to default computing resources in the default model and associating corresponding default values of the plurality of criticality factors to the corresponding computing resource; and
for one or more computing resources identified in the computing infrastructure that corresponds to a default computing resource in the default model, modifying the default values of the criticality factors based on at least one of user specified adjustments, a determination of whether the computing resource is protecting other computing resources in the computing infrastructure, or an evaluation of incident tickets from service management systems associated with the computing resource.

14. The computer program product of claim 9, wherein the computer readable program further causes the security vulnerability analysis engine to:
   perform a lookup operation for a security response to security vulnerabilities in the prioritized listing of security vulnerabilities; and
   output an indication of security responses to the security vulnerabilities specified in the prioritized listing as part of the notification.

15. The computer program product of claim 9, wherein the computer readable program further causes the security vulnerability analysis engine to:
   perform a lookup operation for a security response to security vulnerabilities in the prioritized listing of security vulnerabilities; and
   automatically applying the security responses to the corresponding security vulnerabilities in the prioritized listing of security vulnerabilities.

16. An apparatus comprising:
   a processor; and
   a memory coupled to the processor, wherein the memory comprises instructions which, when executed by the processor, cause the processor to execute a security vulnerability analysis engine that operates to:
   ingest content from a plurality of content source computing devices to identify instances of security vulnerability content in the ingested content;
   perform a security trend analysis on the instances of security vulnerability content to identify a relative ranking of security vulnerabilities;
   identify computing resources of a specified computing infrastructure and a criticality of the computing resources to an operation of the computing infrastructure;
   generate a prioritized listing of security vulnerabilities associated with the computing infrastructure based on the relative ranking of security vulnerabilities and the criticality of the computing resources in the computing infrastructure; and
   output a notification to a user via a user computing device, indicating the prioritized listing of security vulnerabilities, wherein identifying a criticality of the computing resources to an operation of the computing infrastructure comprises:
   evaluating each computing resource of the computing infrastructure with regard to a plurality of criticality factors; and
   ranking the computing resources relative to one another based on results of evaluating the computing resources with regard to the plurality of criticality factors, and wherein the plurality of criticality factors comprise at least one of mission and customer impact, safety and environmental impact, ability to isolate single-point failures, preventative maintenance history, corrective maintenance history, mean time between failures, probability of failure, spares lead time, asset replacement value, or planned utilization rate.

* * * * *